United States Patent [19]

Allewelt

[11] 4,009,314
[45] Feb. 22, 1977

[54] COLORED GLASS FIBER ARTICLES AND PROCESS

[75] Inventor: Arthur L. Allewelt, West Chester, Pa.

[73] Assignee: Rohm and Haas Company, Philadelphia, Pa.

[22] Filed: Oct. 21, 1975

[21] Appl. No.: 624,360

[52] U.S. Cl. .............................. 428/290; 428/273
[51] Int. Cl.$^2$ .................. B32B 27/04; B32B 27/20
[58] Field of Search ....... 260/42.18, 42.21, 89.5 N, 260/28.5, 29.6; 428/378, 392, 395, 290, 273

[56] References Cited
UNITED STATES PATENTS

| | | | |
|---|---|---|---|
| 3,678,098 | 7/1972 | Lewis et al. | 260/89.5 N |
| 3,694,393 | 9/1972 | Lewis et al. | 260/29.6 |

*Primary Examiner*—James J. Bell
*Attorney, Agent, or Firm*—Patrick C. Baker

[57] ABSTRACT

Glass fiber articles such as decorative fabrics are colored with a pigment composition containing a self-curing polymeric binder based on a quaternary ammonium salt. The resulting color has good washfastness without the need for an organosilane coupling agent.

18 Claims, No Drawings

COLORED GLASS FIBER ARTICLES AND PROCESS

BACKGROUND OF THE INVENTION

This invention relates to the coloring of glass fiber articles such as fabrics or other articles containing glass fibers alone or with other fibers or materials.

Glass fiber articles are difficult to color with pigmented compositions so that the resulting color resists removal during laundering (washfastness) unless an organosilane compound is present in the coloring composition. Such compositions conventionally also contain a polymeric binder, the primary function of which is to hold or bind together the pigment particles in the composition. The organosilane additives have functional groups, such as epoxy and amino, which react with the glass of the article to be colored. The organosilane therefore is said to "couple" the pigment-binder composition to the glass fiber article.

Organosilane coupling agents are expensive and must be prediluted before addition to a coloring bath. To date, no effective substitute has been found for the silane coupling agents, although from the standpoints of economy and processability, it would be desirable to entirely eliminate such coupling agents so long as good washfastness of the colored glass fiber article is obtained.

Objects and Summary

Accordingly, an object of the invention is to color glass fiber articles so that the colored article has good washfastness without having to incorporate an organosilane coupling agent into the coloring composition. These and other objects, features and advantages of the invention are achieved by treating a glass fiber article with a pigmented coloring composition wherein the pigment binder (a polymeric material) also has the ability to couple the pigment to the glass article. The polymeric binder has the further advantage that it is essentially self-curing at low temperatures so that a separate curing step normally is not required. The energy requirements for the coloring of glass fiber articles, therefore, may be less than when coloring glass fiber articles with conventional pigmented compositions. Furthermore, the polymeric binder can be selected to promote a soft hand of the treated article, if desired.

The coloring compositions contain as essential ingredients a conventional pigment and a polymeric binder in an amount effective to adhere the pigment to the glass fiber article. The polymeric binders are homopolymers and, preferably, copolymers having a quaternary ammonium group based upon monoethylenic unsaturation and epihalohydrin interaction. Typical of such polymeric materials are the reaction products of a) a hydrogen acid salt of dimethylaminoethyl methacrylate and epichlorohydrin, and b) a lower alkyl acrylate. These and other polymeric coatings, and other features and advantages of the invention, are more fully described below.

DETAILED DESCRIPTION

The polymeric binders to be applied to the glass fiber articles in accordance with the invention are described in U.S. Pat. Nos. 3,678,098 and 3,694,393 to Lewis, Merritt and Emmons, assigned to Rohm and Haas Company. While extended description of the polymers therefore is not required, the following description will summarize the essential characteristics of the polymers and will also point out preferred embodiments.

The polymers of the binders comprise two groups as follows:

A. homopolymers and copolymers of a quaternary monomer prepared by reacting an epihalohydrin of the formula

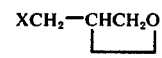

B. the reaction product of homopolymers or copolymers of the foregoing amine salts and the epihalohydrin.

In the foregoing structures, R is hydrogen or methyl, X is a halogen atom such as iodine, bromine or chlorine, A is a ($C_2$–$C_6$) alkylene group having at least two carbon atoms in a chain between adjoined oxygen and nitrogen atoms or A may be a polyoxyethylene group of the formula $(CH_2CH_2O)_xCH_2CH_2$ wherein $x$ is at least 1, and Y is an anion which promotes water solubility of the amine salt. Typical of such anions are the halogen ions of halogen acids, or the anion of any other acid, such as nitrate, phosphate, acid phosphate, sulfate, bisulfate, methyl sulfate, carboxylate, sulfonate, sulfanate, acetate, formate, oxalate, acrylate, and α-methacryloxy-acetate. Preferably, Y is the anion of an acid having an ionization contant ($pK_a$) of 5.0 or less, i.e., a dissociation such that the hydrogen ion concentration is at least $10^{-5}$.

The copolymers of the quaternary monomers of group A or the copolymers of the amine salts to be reacted with epihalohydrin to form the copolymers of group B are formed by reaction with at least one other α,β-monoethylenically unsaturated monomer, particularly the esters of acrylic acid or methacrylic acid with ($C_1$–$C_{18}$) alcohols, acrylonitrile, methacrylonitrile, acrylamide, methacrylamide, N-methylolacrylamide, N-monoalkyl and N-dialkyl acrylamides and methacrylamides, and other monomers such as set forth in the aforementioned patents.

From the standpoint of pigment binding properties and ability to couple the pigment to the glass fiber article, the amounts of polymeric binder in the coloring composition and the quantities ("add on") of polymeric binder applied to the glass fiber article are not critical and may be any amount which will bring about these results while also being compatible with other ingredients of the composition, such as softeners, opacifiers, catalysts, and the like. For such purposes, therefore, the polymeric binders may comprise anywhere from about 0.1 to about 20% by weight or more of the coloring composition. However, there is a practical limitation when the glass fiber article is a fabric for use as a decorative fabric in homes or offices, such as draperies and the like. This limitation is flammability, since, like any organic substance, the risk of flammability increases with the increase in add-on of polymeric binder on the fabric.

Another limitation, which must be balanced with the washfastness and the need to maintain a required level of non-flammability in the treated article, is the extent to which the polymeric binder will add to or detract from the desired "hand" of the treated article. In certain applications a soft hand is desirable, as in the case of draperies, whereas in other applications, such as lampshades and structural panels, hand is not an important consideration. As will be explained below, certain of the polymeric binders will provide a softer hand than others and, of course, the softness of hand is related to the total quantity of polymeric binder add-on on the glass article. Generally, from the standpoint of non-flammability, the amount of polymeric binder add-on may be about 0.1 to about 6% by weight of the glass fiber article, preferably about 1–5% by weight, same basis. In the aqueous coloring compositions applied to the article, the amounts of pigment and binder also are not critical. About 1–10% of pigment and about 1–20% by weight of polymeric binder solids will be effective, provided that the add-on of polymeric binder is maintained within the limits suggested above. The amounts of binder and pigment in the coloring composition will also depend, of course, on other ingredients usually present in such composition, such as catalysts, dispersants, pH control agents, opacifiers, dulling agents, auxiliary softening agents, and finishing agents of various types.

From the standpoint of improved hand, certain of the polymeric binders are preferred over others. Such preferred polymers are copolymers containing about 10–99% by weight of at least one alkyl ester of acrylic or methacrylic acid. Thus, by selection of appropriate monomer or monomers of these types, the polymeric binders will not only provide improved glass fiber-pigment coupling properties, but also appropriate degrees of film softness, stiffness (modulus) and tensile strength, while also providing processing benefits such as low temperature curing. Furthermore, although coupling, binding and softening properties may be greater when using a polymer containing over 10% by weight of the quaternary ammonium salt, the viscosity of the polymeric binder emulsion is also thereby increased. Such viscosity increase may make blending into the coloring composition somewhat more difficult. As a general rule, therefore, 1–10% by weight of the ammonium salt in the polymer is quite sufficient.

Although comonomers may be selected which generally provide a second order transition temperature ($T_{300}$) in the resulting film ranging from −40° C. to +40° C., representing extreme softness introducible by acrylates such as 2-ethylhexyl acrylate or butyl acrylate, to the rather extreme stiffness and brittleness introducible by a methacrylate such as methyl methacrylate, the degree of softness or stiffness may be of no concern in many applications. $T_{300}$ in this context is the temperature at which a modulus of 300 kg/cm$^2$ is obtained. It has been found that a good balance of properties is obtained when using polymeric binders containing in the polymer 10–99% by weight of at least one lower alkyl acrylate, of which ethyl acrylate is preferred at a level of about 92–97%, the balance being the portion of the copolymer containing the quaternary ammonium group.

If desired, resistance of the treated glass fiber articles to dry cleaning solvents can be obtained by selecting polymers wherein some of the alkyl acrylate comonomer is replaced with acrylonitrile. About 1–20% by weight, preferably 5–15%, of acrylonitrile based on total polymer weight, will be effective for this purpose.

The polymeric binders, prior to formulation into coloring compositions, are coveniently prepared as polymer emulsions of about 20–70% polymer solids. As already indicated, the solids content is related to the proportion of quaternized ammonium salt in the polymer and to processing conditions including viscosity and the form and rate of application of the coloring composition and may be varied accordingly. The coloring compositions may be applied to the glass fiber articles by any of the conventional manners known in the art. These include padding, spraying, dipping, roll coating, knife coating, and the like, depending on the form of the glass fiber articles, i.e., whether in the form of fabrics or other form.

Emulsion polymer particle size can also be regulated in known ways to promote efficient application and stability. The polymer emulsions, apart from the coloring compositions, may contain any of the ingredients conventionally present in polymer emulsions, such as dispersants (nonionic, anionic, or mixtures), polymerization initiators, and accelerators. These and other aspects of forming polymeric emulsions from acrylic monomers are well-known, as described, for example, in U.S. Pat. Nos. 2,754,280 and 2,795,564.

The glass fiber article may be in any form normally treated with pigmented coloring compositions. Thus, the article may be glass fibers of any type, alone or in combination with other fibers or may be in the form of woven or non-woven fabrics designed both for textile and non-textile uses. Such fabrics include decorative or utilitarian materials, such as drapes, curtains, wallcoverings, tapes, insulating materials, paper and tape reinforcements, backings, sleeving and tubing. The fibers may be continuous filaments or staple and may be in a manufactured or semi-manufactured form such as lamp shades, cordage, and the like.

The pigments of the coloring composition generally are any of the insoluble organic pigment types used to color glass fiber articles, such as phthalocyanine pigments, alone or in admixture with other additives such as titanium dioxide, lithopone or other dulling agents such as lead sulfide and barium sulfate. The coloring composition may contain any other conventional additives such as softeners, dispersants, catalysts, stabilizers, finishing agents, alkaline materials for pH control, and inert substances for thickening and other known purposes.

The coloring compositions may be applied to discrete areas of the glass article, but more usually is coated uniformly on the article, depending on the coloration desired. Although no separate curing step is required after application of the coloring composition to the article, since the polymeric binders are self-curing upon elimination of water (as by merely permitting them to dry at ambient room temperature), the curing may be accelerated by conventional drying techniques.

The following examples will serve as further illustration of the invention but are not necessarily limitative except as set forth in the claims. All parts and percentages are by weight unless otherwise indicated.

EXAMPLE 1 a. Preparation of Quaternary Monomer

A flask equipped for stirring, automatic temperature control, addition, and vacuum distillation is charged with 470 grams of deionized water and 89.4 grams of concentrated (70%) nitric acid. A supply of dimethylaminoethyl methacrylate (168.8 grams) is gradually added and the temperature maintained at less than 35° C. Epichlorohydrin (92.5 grams) is added all at once and the temperature is maintained at 50° C. for 3 hours.

Finally, at 50–100 mm Hg and 50° C., 43 grams of water containing unreacted epichlorohydrin is distilled off and the pH of the batch is adjusted to 5.0 with nitric acid.

b. Preparation of Polymer Emulsion

A flask equipped for stirring, cooling, addition and condensing was charged with an emulsion consisting of 1042.4 grams deionized water, 51.4 grams of a 70% solution of an t-octylphenoxy polyethoxyethanol surfactant, 72.0 grams of a 0.1% solution of $FeSO_4 \cdot 7 H_2O$, 19.8 grams of a 1% solution of "Versene" chelating agent, 360 grams of an ethyl acrylate "seed," and 2.6 grams of a 55% solution of diisopropyl benzene hydroperoxide. After sparging with nitrogen, 0.72 grams of "Formopon" sodium sulfoxylate formaldehyde and 51.4 grams of a 70% solution of the same surfactant are added. An emulsion of 1386 grams of ethyl acrylate, 181.2 grams of the quaternary monomer solution prepared in Part a), 10.5 grams of a 50% solution of diisopropylbenzene hydroperoxide, 51.4 grams of a 70% solution of t-octylphenoxy polyethoxyethanol and 450 grams of deionized water is added over a period of 3 hours. Concurrently, a solution of 2.88 grams of Formopon in 219.4 grams of deionized water is added while maintaining the temperature at 60° C.

EXAMPLE 2

The emulsion of Example 1b was formulated into two pigment dyeing baths (A,B) for glass fiber fabric commercially available from Ownes-Corning Fiberglas Corporation. Bath A contained an organosilane coupling agent and bath B did not. Suitable control baths (C,D) were made with a conventional acrylic polymer emulsion. The ammonia is present to aid in pigment dispersion. These formulations are given in Table I.

TABLE I

| Product | Pigment Dyeing Baths (grams) | | | |
|---|---|---|---|---|
| | A | B | Control C | Control D |
| Water } pre-mix | 14 | 14 | 14 | 14 |
| Rhotex A-9[1] | 14 | 14 | 14 | 14 |
| Z-6040 coupler[2] | 2 | — | 2 | — |

TABLE I-continued

| Product | Pigment Dyeing Baths (grams) | | | |
|---|---|---|---|---|
| | A | B | Control C | Control D |
| $NaHCO_3$ catalyst | 1 | 1 | — | — |
| Water | 278 | 278 | 278 | 278 |
| Rhoplex HA-4[3] | — | — | 40 | 40 |
| Copolymer Emulsion[4] | 40 | 40 | — | — |
| $NH_3$ (28% aqueous) | 1 | 1 | 1 | 1 |
| Aqua Hue Blue BGG[5] } pre-mix | 8 | 8 | 8 | 8 |
| Water | 42 | 42 | 42 | 42 |
| | 400 | 398 | 399 | 397 |

[1] Emulsion of Paraplex G-62 from Rohm and Haas Company (50% solids) as auxiliary softener.
[2] Gamma-glycidoxypropyl trimethoxy silane from Dow Corning Corp.
[3] A non-quaternary copolymer emulsion (46% solids) from Rohm and Haas Company.
[4] Example 1b (46% solids)
[5] Phthalocyanine pigment dispersion from Synalloy Corp. (about 30–35% solids).

Pieces of glass fiber casement fabric were padded with the formulations of Table I so as to deposit about 4% total copolymer solids (based on fabric weight) uniformly on the fabric. The fabrics were then dried for 1 minute at 165° C. The coated fabrics were then washed in a domestic type automatic washer at 40° C. Upon drying after washing, the fabrics treated with the formulations (baths A,B) containing the copolymer of Example 1b were observed to have retained essentially all of their color and there was no substantial difference in the washfastness of the fabrics. The fabrics treated with the conventional acrylate binder and the silane coupling agent (bath C) retained almost all of the color. The fabric not treated with the silane (bath D), however, lost almost all of its color.

EXAMPLE 3

Example 2 was essentially repeated except that another conventional acrylic polymer emulsion (Rhoplex K-3) was used in place of Rhoplex HA-4 as a control, and a lithopone pigment was added to deluster the fabric. These formulations are given in Table II.

TABLE II

| Product | Pigment Dyeing Baths (grams) | | | |
|---|---|---|---|---|
| | A | B | Control C | Control D |
| Water } pre-mix | 7.5 | 7.5 | 7.5 | 7.5 |
| Kemprint White GD[1] | 22.5 | 22.5 | 22.5 | 22.5 |
| Water } pre-mix | 14 | 14 | 14 | 14 |
| Rhotex A-9 | 14 | 14 | 14 | 14 |
| Water } pre-mix | 38 | — | 38 | — |
| Z-6040 coupler | 2 | — | 2 | — |
| $NH_3$ (28% aqueous) | 1 | 1 | 1 | 1 |
| Water } pre-mix | 42 | 42 | 42 | 42 |
| Aqua Hue Blue BGG | 8 | 8 | 8 | 8 |
| Copolymer Emulsion[2] | 40 | 40 | — | — |
| Rhoplex K-3[3] | — | — | 40 | 40 |
| $NaHCO_3$ catalyst | 1 | 1 | — | — |
| Water | 210 | 250 | 210 | 250 |
| | 400 | 400 | 399 | 399 |

[1] Lithopone pigment dispersion (60% solids) from Sherwin Williams Company.
[2] Example 1b (46% solids).
[3] A non-quaternary copolymer emulsion (46% solids) from Rohm and Haas Co.

The fabrics of this example were given five automatic washes at 40° C. Again the copolymer of Example 1b acted to retain essentially all of the color on the fabric whether used with (bath A) or without (bath B) the silane coupler. The fabric treated with silane (bath C) retained almost all of the color, and that without coupling agent (bath D) lost most of the color.

EXAMPLE 4

Example 1b was repeated except that half the ethyl acrylate was replaced by butyl acrylate. The resulting emulsion (about 46% solids) was used in the washfastness test of Example 3 with essentially the same results, but the fabrics treated with the pigment bath of this Example 4, containing the butyl acrylate, exhibited softer hand.

What is claimed is:

1. A glass fiber article treated with a coloring composition comprising a pigment and a polymeric binder, the amount of polymeric binder being effective to adhere the pigment to the article, said polymeric binder being selected from:
   A. homopolymers and copolymers of a quaternary monomer prepared by reacting an epihalohydrin of the formula

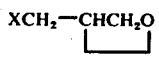

with an amine salt of the formula $H_2C=C(R)C(O)O-A-N(CH_3)_2 \cdot HY$; and
   B. the reaction product of homopolymers or copolymers of said amine salt and said epihalohydrin;
   wherein R is hydrogen or methyl, X is iodine, bromine or chlorine, A is a $(C_2-C_6)$ alkylene group having at least two carbon atoms in a chain between adjoined O and N atoms or A may be a polyoxyethylene group of the formula $(CH_2CH_2O)_xCH_2CH_2$ wherein $x$ is at least 1, and Y is an anion.

2. A glass fiber article as in claim 1 wherein said polymeric binder is a copolymer of said quaternary monomer and at least one other $\alpha,\beta$-monoethylenically unsaturated monomer.

3. A glass fiber article as in claim 2 wherein said other monomer is a lower alkyl ester of acrylic or methacrylic acid.

4. A glass fiber article as in claim 1 wherein said polymeric binder is a copolymer of a quaternary monomer prepared by reacting a) a hydrogen acid salt of dimethylaminoethyl methacrylate and epichlorohydrin, and b) a $(C_1-C_4)$ alkyl acrylate, in proportions of 1–90 wt. % of said quaternary monomer to 99–10 wt. % of said alkyl acrylate.

5. A glass fiber article as in claim 4 wherein said alkyl acrylate is ethyl acrylate.

6. A glass fiber article as in claim 5 wherein the amount of said ethyl acrylate is 92–97 wt. %.

7. A glass fiber article as in claim 1 wherein the article is treated with an amount of coloring composition effective to uniformly deposit on the article about 0.1–20% of said polymeric binder based on the weight of said article.

8. A glass fiber article as in claim 1 wherein the article is treated with an amount of coloring composition effective to uniformly deposit on the article about 1–6% of said polymeric binder based on the weight of said article.

9. A glass fiber article as in claim 1 wherein said article is a fabric.

10. A process for coloring a glass fiber article, which comprises treating the article with a coloring composition comprising a pigment and a polymeric binder, the amount of polymeric binder being effective to adhere the pigment to the glass fiber article, said polymeric binder being selected from:
    A. homopolymers and copolymers of a quaternary monomer prepared by reacting an epihalohydrin of the formula

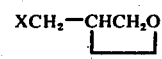

with an amine salt of the formula $H_2C=C(R)C(O)O-A-N(CH_3)_2 \cdot HY$; and
    B. the reaction product of homopolymers or copolymers of said amine salt and said epihalohydrin;
    wherein R is hydrogen or methyl, X is iodine, bromine or chorine, A is a $(C_2-C_6)$ alkylene group having at least two carbon atoms in a chain between adjoined O and N atoms or A may be a polyoxyethylene group of the formula $(CH_2CH_2O)_xCH_2CH_2$ wherein $x$ is at least 1; and Y is an anion.

11. A process as in claim 10 wherein the polymeric binder is a copolymer of said quaternary monomer and at least one other $\alpha,\beta$-monoethylenically unsaturated monomer.

12. A process as in claim 11 wherein said other monomer is a lower alkyl ester of acrylic or methacrylic acid.

13. A process as in claim 10 wherein said polymeric binder is a copolymer of a quaternary monomer prepared by reacting (a) a hydrogen acid salt of dimethylaminoethyl methacrylate and epichlorohydrin, and (b) a $(C_1-C_4)$ alkyl acrylate, in proportions of 1–90 wt. % of said quaternary monomer to 99–10 wt. % of said alkyl acrylate.

14. A process as in claim 13 wherein said alkyl acrylate is ethyl acrylate.

15. A process as in claim 14 wherein the amount of said ethyl acrylate is 92–97wt. %.

16. A process as in claim 10 wherein said article is treated with an amount of coloring composition effective to uniformly deposit on the article about 0.1–20% of said polymeric binder based on the weight of said article.

17. A process as in claim 10 wherein said article is treated with an amount of coloring composition effective to uniformly deposit on the article about 1–6% of said polymeric binder based on the weight of said article.

18. A process as in claim 10 wherein said article is a fabric.

* * * * *